(12) United States Patent
Kafka et al.

(10) Patent No.: US 11,165,218 B2
(45) Date of Patent: Nov. 2, 2021

(54) LOW REPETITION RATE INFRARED TUNABLE FEMTOSECOND LASER SOURCE

(71) Applicant: NEWPORT CORPORATION, Irvine, CA (US)

(72) Inventors: James Kafka, Palo Alto, CA (US); Ching-Yuan Chien, Santa Clara, CA (US); Andrei Florean, Menlo Park, CA (US); Travis Petersen, San Jose, CA (US); Alan Petersen, Palo Alto, CA (US)

(73) Assignee: MKS INSTRUMENTS, INC., Andover, MA (US)

( * ) Notice: Subject to any disclaimer, the term of this patent is extended or adjusted under 35 U.S.C. 154(b) by 81 days.

(21) Appl. No.: 16/778,567

(22) Filed: Jan. 31, 2020

(65) Prior Publication Data
US 2020/0251878 A1 Aug. 6, 2020

Related U.S. Application Data

(60) Provisional application No. 62/800,441, filed on Feb. 2, 2019.

(51) Int. Cl.
| | |
|---|---|
| *H01S 3/10* | (2006.01) |
| *H01S 3/11* | (2006.01) |
| *H01S 3/106* | (2006.01) |
| *H01S 3/105* | (2006.01) |
| *H01S 3/102* | (2006.01) |
| *H01S 3/30* | (2006.01) |
| *H01S 3/00* | (2006.01) |
| *G01N 21/25* | (2006.01) |

(52) U.S. Cl.
CPC ............ *H01S 3/1103* (2013.01); *H01S 3/105* (2013.01); *H01S 3/1024* (2013.01); *H01S 3/1066* (2013.01); *H01S 3/1068* (2013.01); *H01S 3/11* (2013.01); *H01S 3/1106* (2013.01); *G01N 21/255* (2013.01); *H01S 3/0092* (2013.01); *H01S 3/302* (2013.01)

(58) Field of Classification Search
CPC .... H01S 3/1103; H01S 3/1066; H01S 3/1068; H01S 3/1106; H01S 3/1024; H01S 3/105
See application file for complete search history.

(56) References Cited

U.S. PATENT DOCUMENTS

| | | | |
|---|---|---|---|
| 5,003,545 A * | 3/1991 | Kowalski | H01S 3/0057 372/25 |
| 7,924,902 B2 * | 4/2011 | Kopf | H01S 3/235 372/93 |
| 2008/0037595 A1 | 2/2008 | Gankkhanov et al. | |
| 2008/0240171 A1 | 10/2008 | Spinelli et al. | |

(Continued)

OTHER PUBLICATIONS

Eric O. Potma, et al., "30fs, Cavity-dumped Optical Parametric Oscillator", Optics Letters vol. 23, No. 22, Nov. 15, 1998. p. 1763-1765.

(Continued)

*Primary Examiner* — Kinam Park
(74) *Attorney, Agent, or Firm* — Brian F. Swienton (57) ABSTRACT

The present application discloses a cavity dumped low repetition rate infrared tunable femtosecond laser source configured to produce pulses of 200 femtoseconds or less with a peak power of four megawatts or more for use in a variety of applications including multi-photon microscopy.

37 Claims, 4 Drawing Sheets

(56) References Cited

U.S. PATENT DOCUMENTS

| | | | | |
|---|---|---|---|---|
| 2008/0273559 | A1* | 11/2008 | Grishin | H01S 3/1103 |
| | | | | 372/25 |
| 2009/0168148 | A1 | 7/2009 | Kondo et al. | |
| 2010/0328761 | A1* | 12/2010 | Reid | G02F 1/39 |
| | | | | 359/330 |
| 2011/0194172 | A1 | 8/2011 | Esteban Martin et al. | |
| 2012/0250706 | A1* | 10/2012 | Stiens | H01S 3/106 |
| | | | | 372/19 |
| 2014/0321484 | A1* | 10/2014 | Sierra | A61B 18/203 |
| | | | | 372/18 |
| 2016/0294154 | A1 | 10/2016 | Tanaka et al. | |
| 2020/0251878 | A1* | 8/2020 | Kafka | H01S 3/302 |

OTHER PUBLICATIONS

Chang-Ki Min, et al., "Near-infrared Cavity-dumped Femtosecond Optical Parametric Oscillator", Optics Letters, vol. 30 No. 14, Jul. 15, 2005. p. 1855-1857.

Tobias P. Lamour, et al., "650-nJ From a Cavity-dumped Yb:fiber-pumped ultrafast Optical Parametric Oscillator", Optics Express, vol. 19, No. 18, Aug. 16, 2011. p. 17557-17562.

E Yoon, et al., "Cavity-dumped Femtosecond Optical Parametric Oscillator based on Periodically Poled Stoichiometric Lithium Tantalate", Laser Phsics Letters, 13, published Feb. 8, 2016. 5 pages.

International Search Report issued to PCT/US2020/016132, 3 pages.

Written opinion issued to PCT/US2020/016132 dated Jul. 27, 2021, 8 pages.

* cited by examiner

LOW REPETITION RATE INFRARED TUNABLE FEMTOSECOND LASER SOURCE

CROSS-REFERENCE TO RELATED APPLICATION

The present application claims priority to U.S. Provisional Application Ser. No. 62/800,441, entitled "Low Repetition Rate Infrared Tunable Femtosecond Laser Source," filed on Feb. 2, 2019, the entire contents of which are incorporated by reference herein.

BACKGROUND

In multi-photon microscopy, longer excitation wavelengths allow deeper imaging due to reduced scattering. Absorption by water present in the tissue favors select wavelengths located within the water transparency windows. In particular, the wavelength regions around 1300 nm and 1700 nm are particularly desired in some applications. The most common fluorescent dyes have been developed for use in two-photon microscopy. For example, green-fluorescent-protein (GFP) can be excited by a single photon at ≈460 nm, two photons at 920 nm (the most common application) or three photons at ≈1300 nm. Despite the much higher penetration depth, three-photon excitation requires much higher peak powers, since the absorption cross-section is dramatically reduced compared to two-photon excitation.

Better signals (e.g. improved signal to noise ratio) can be obtained by increasing the average power, decreasing the pulse duration or increasing the pulse energy. Higher energies can be achieved for a constant average power by decreasing the repetition rate. Tissue damage due to thermal effects may occur when average powers of about 100 mW or more are directed on the tissue surface. Pulse durations can be reduced from about 100 fs to 50 fs, thereby resulting in a 2× increase in peak intensity. As such, an order-of-magnitude increase in peak power may be realized by increasing the energy per pulse at reduced repetition rates. Employing repetition rates of 1-4 MHz, instead of the 80 MHz typically used in two-photon excitation, may result in an 80×-20× increase in pulse energy and peak intensity without violating the average power limit. Consequently, a laser source configured to provide a 1-4 MHz pulse train with energies of many hundreds of nJ (preferably >1 µJ) and pulse durations of 100 fs or shorter, tunable around 1300 nm and 1700 nm is desired for multi-photon imaging.

In multi-photon microscopy, the strength of the fluorescence signal increases drastically with increased peak intensity of the excitation pulse. As described above, increased peak intensity can be obtained by compressing the pulse duration to a value as close as possible to the theoretical limit (e.g. the transform-limit duration). The output signal pulse or excitation pulse needs to be directed to the sample, after passing through the various components of the multiphoton microscope. Often, the laser signal being directed through the multiphoton microscope is pre-compressed. For example, the dispersion of the pulses of the signal from the laser being input into the multiphoton microscope has an opposite sign to that imparted by the multiphoton microscope such that the total dispersion will be close to zero, resulting in a compressed pulse arriving at the sample.

In light of the foregoing, there is an ongoing need for a low repetition rate infrared tunable femtosecond laser source for use in multiphoton microscopy applications. Further, there is an ongoing need for a high energy ultrafast laser source configured to output an output signal having a wavelength of about 1300 nm and about 1700 nm. In addition, there is a further need for a laser source configured for use in for three-photon excitation with having an output signal greater than 4 MW of peak power. Further, there is a long-felt need for a low repetition rate tunable infrared femtosecond laser source capable of outputting an output signal having an energy greater than 1 µJ and pulse durations of about 200 fs or less.

SUMMARY

The present application discloses several embodiments of a low repetition rate infrared tunable femtosecond laser source. In some embodiments, the laser source outputs one or more infrared tunable femtosecond output signals having a repetition rate from about 100 kHz to about 12 MHz. In another embodiment, the laser source outputs one or more infrared tunable femtosecond output signals having a repetition rate from about 250 kHz to about 6 MHz. It still another embodiment, the laser source outputs one or more infrared tunable femtosecond output signals having a repetition rate from about 400 kHz to about 4 MHz, although those skilled in the art will appreciate that the laser source may be configured to output optical signals at any variety of repetition rates. In one embodiment, the laser source includes a laser cavity having at least one curved mirror and at least one reflector therein. The curved mirrors and reflectors are positioned within the laser cavity. Further, at least one pump source configured to output at least one pump signal which is input into the laser cavity. Similarly, at least one nonlinear optical crystal may be positioned within the laser cavity. One or more modulators may be positioned within the laser cavity. Optionally, the curved mirrors and/or the reflectors may be positioned on or be in communication with at least one movable stage. For example, in one embodiment, the movable stage may be configured to permit the length of the laser cavity to be selectively varied. During use, the pump source outputs the pump signal which may be used to pump the nonlinear optical crystal, thereby producing at least one intracavity signal. The intracavity signal traverses through the cavity and may be emitted through at least one of the curved mirrors and/or reflectors. The output signal of the laser source may be selected between a first wavelength range of about 1200 nm to about 1400 nm and a second wavelength range of about 1600 nm and about 1800 nm. In one embodiment, the output signal of the laser source has a peak power of 4 MW or more.

In another embodiment, the present application is directed to a low repetition rate infrared tunable femtosecond laser source. More specifically, the present application discloses a laser source which includes a laser cavity having at least one curved mirror and at least one reflector positioned therein. A pump source is in communication with the laser cavity. The pump source may be configured to emit at least one pump signal into the laser cavity. The pump signal may be directed into at least one nonlinear optical crystal positioned within the laser cavity. The nonlinear optical crystal is configured to generate at least one intracavity signal when the nonlinear optical crystal is pumped by the pump signal. At least one electro-optic modulator may be positioned within the laser cavity and configured to selectively modulate the intracavity signal. At least one output signal is generated within and emitted from the laser cavity. The output signal of the laser source may be selected between a first wavelength range of about 1200 nm to about 1400 nm and a second wavelength range of about 1600 nm and about 1800 nm. In one embodiment, the output signal of the laser source has a peak power of 4 MW or more Other features and advantages of the low repetition rate tunable infrared femtosecond laser source as described herein will become more apparent from a consideration of the following detailed description.

BRIEF DESCRIPTION

The novel aspects of the low repetition rate infrared tunable femtosecond laser source as disclosed herein will be more apparent by consideration of the following figures, wherein.

DETAILED DESCRIPTION

The present application is directed to various embodiments of a low repetition rate infrared tunable femtosecond laser source. In one embodiment, the various embodiments of the laser sources disclosed herein may be configured to output a tunable output signal within multiple selected wavelength ranges. For example, the laser source may be configured to output an output signal having a wavelength range of about 850 nm to about 2500 nm, and within selected wavelength ranges therein. In one embodiment the laser source may be configured to output an output signal having a wavelength of about 1200 nm to about 1400 nm. Thereafter, the laser source may be easily configured to output an output signal having a wavelength of about 1600 nm to about 1800 nm. In one specific embodiment, the same laser source may be configured to out output an output signal having a wavelength of about 1300 nm and reconfigured to output an output signal of about 1700 nm. Further, in one embodiment, the present application describes a laser source which provides femtosecond pulses having a pulse energy of about 250 nJ to about 2500 nJ. Optionally, the laser source may be configured to provide femtosecond pulses having a pulse energy from about 500 nJ to about 1500 nJ. Further, the laser source may be configured to output an output signal at a low repetition rate of about 250 kHz to about 12 MHz and a tuning range including, but not limited to, about 1200 nm to about 1400 nm and about 1600 nm to about 1800 nm. In addition, the laser source disclosed herein may be configured to produce output signals having high peak power, in excess of 2 MW. In one embodiment, the laser source is configured to output an output signal having a peak power of 4 MW or more, although those skilled in the art will appreciate that the laser source may be configured to output signals having peak powers less than 4 MW. As such, the laser source described herein may be used in any variety of applications. For example, the laser source may be particularly well suited for applications involving multi-photon microscopy, a technique which enables imaging at depth of 1 mm and beyond in tissues and organs such as the brain, although those skilled in the art will appreciate that the various embodiments of the laser source disclosed herein may be used in any variety of applications.

Figure 1:
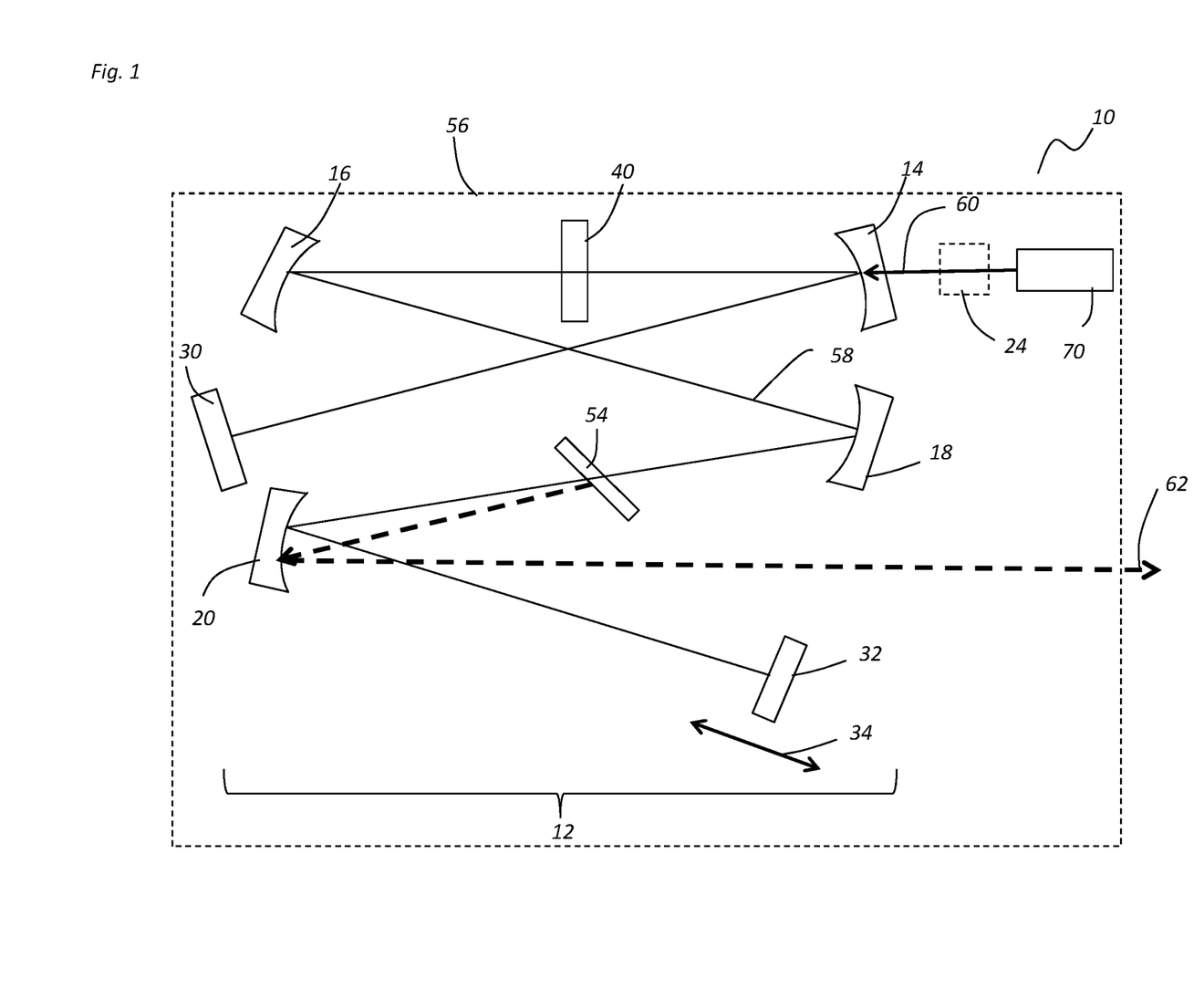
FIG. 1 shows a schematic diagram of the embodiment of a low repetition rate infrared tunable femtosecond laser source which includes a reflector configured to have an output signal transmitted therethrough.

FIG. 1 shows an embodiment of a low repetition rate infrared tunable femtosecond laser source. As shown, the laser source 10 includes a laser cavity 12 having a first curved mirror 14, a second curved mirror 16, a third curved mirror 18, and at least a fourth curved mirror 20 positioned therein, although any number of curved mirrors may be used in the laser source 10. Further one or more reflectors may be used within the cavity 12. In the illustrated embodiment, a first reflector 30 and at least a second reflector 32 are used within the cavity 12. In the illustrated embodiment the first and second reflectors 30, 32 comprise planar mirrors although those skilled in the art will appreciate that the first and/or second reflectors 30, 32 may comprise curved mirrors. As shown in FIG. 1, at least one of the mirrors 14, 16, 18, 20, and reflectors 30, 32 may be positioned on at least one movable stage 34. In the illustrated embodiment, the second reflector 32 is positioned on at least one computer—controlled stage which acts as a movable stage 34 and may be configured to selectively vary the length of the cavity 12 to match the repetition rate of the pump signal 60. Optionally, the movable mount 34 may be configured to permit lateral movement, longitudinal movement, and/or tip, tilt, or otherwise selectively vary the position of the second reflector 32. As shown, at least one pump signal 60 emitted from at least one pump source 70 is injected into the cavity 12 via the first curved mirror 14. As such at least one of the curved mirrors 14, 16, 18, 20 and/or the reflectors 30, 32 may comprise a dichroic mirror. In one embodiment, the pump source 70 comprises a mode locked laser having at least one gain medium chosen from Yb:YAG, Yb:KGW, Yb:CaF$_2$, Yb:CALGO, Yb:KYW, or a fiber laser, although those skilled in the art will appreciate any variety of laser devices may be used to form the pump source 70. In the illustrated embodiment, the pump source 70 is positioned within the housing 56, although those skilled in the art will appreciate that the pump source 70 may be positioned external of the housing 56. Optionally, at least one harmonic generator 24 may be used in conjunction with the pump source 70. Optionally, at least one harmonic generator 24 may be used to modify the output of the pump source 70. In one embodiment, the harmonic generator 24 comprises a second harmonic generator. In one embodiment, the pump signal 60 has a wavelength from about 900 nm to about 1300 nm. Optionally, the pump signal 60 may have a wavelength from about 1000 nm to about 1100 nm. In a specific embodiment, the pump signal 60 has a wavelength of about 1040 nm. In another embodiment, the pump signal 60 has a wavelength of about 500 nm to about 600 nm. For example, the pump signal 60 may have a wavelength of about 520 nm.

As shown in FIG. 1, at least one nonlinear optical crystal 40 may be positioned within the laser cavity 12. Like the previous embodiments, any variety of materials may be used to form the nonlinear optical crystal 40 including, without limitation, Lithium triborate (LBO), Bismuth triborate (BiBO), β-Barium borate (BBO), Barium gallium sulfide (BGS), Barium gallium selenide (BGSe), Mercury thiogallate (HGS), orientation-patterned gallum phosphide (OP-GaP), periodically poled Lithium Niobate (PPLN), periodically poled Lithium tantalite (PPLT), Potassium titanyl phosphate (PKTP), and other critically or non-critically phase-matched or periodically/aperiodically poled crystals. Aperiodically poled crystals refers to crystals having non-uniform poling periods relative to the direction of propagation to the signal 58. This nonuniform poling period may be transverse to the beam (fan grating), parallel to the propagation (chirped grating), or achromatic phase-matching with non-collinear aperiodic poling. During use, the nonlinear optical crystal 40 is configured to be pumped by the pump signal 60 to form at least one intracavity beam or signal 58 which circulates within the cavity 12. As shown, the intracavity signal 58 traversing through the laser cavity 12 may be incident upon at least one modulator 54 positioned within the laser cavity 12. In the illustrated embodiment, the modulator 54 comprises an acousto-optical modulator, although those skilled in the art will appreciate any variety of modulators may be used in the laser source 10. As such, the modulator 54 may be manufactured from any variety of materials including fused silica, crystalline quartz, flint glass such as SF6 and SF10, chalcogenide glass, Germanium, Gallium phosphide (GaP), Li:Niobate or Tellurium dioxide (TeO$_2$) and the like. Further, the modulator 54 may be configured to act as a cavity dumper.

In one embodiment, the switching time of the modulator (e.g. cavity dumping device) may be of the order of 12 ns. In practice, both acousto-optic (AO) and electro-optic (EO) modulators may be configured to operate within this constraint. However, because AO modulators are based on slow-moving sound waves, the laser beam should be tightly focused inside the AO material, increasing the risk of damage. In addition, the efficiency with which the pulse can be switched out of the cavity is typically less than 50% in AO modulators. In contrast, switching efficiencies approaching one hundred percent (100%) have been demonstrated in EO modulators. The EO modulator rotates the polarization of the passing laser beam from horizontal to vertical polarization (or the opposite way) and the pulses are then extracted through a polarizing optical element acting as an output coupler. This technique automatically allows variable repetition rates, a desirable characteristic in some applications such as multi-photon microscopy. A challenge is to drive these modulators at higher repetition rates. We have developed an EO modulator and driver capable of complete cavity dumping beyond 4 MHz repetition rates for the first time. The configuration we describe provides the highest peak power obtained and at the two wavelength bands that are required for the three-photon application.

During use, the modulator 54 may be configured to selectively direct at least a portion of the intracavity signal 58 out of the cavity 12 via the fourth curved mirror 20 to form at least one output signal 62 which may be outputted from a device housing 56. The output signal 62 may have a pulse energy of from about 250 nJ to about 2500 nJ. In one specific embodiment the output signal 62 has a pulse energy from about 500 nJ to about 1500 nJ. Optionally, the output beam 62 may have a pulse duration from about 10 fs to about 300 fs. In one embodiment, the output beam 62 has a pulse duration from about 50 fs to about 150 fs. The laser source 10 may be configured to output one or more infrared tunable femtosecond output signals having a repetition rate from about 100 kHz to about 12 MHz. In another embodiment, the laser source outputs one or more infrared tunable femtosecond output signals having a repetition rate from about 250 kHz to about 6 MHz. It still another embodiment, the laser source outputs one or more infrared tunable femtosecond output signals having a repetition rate from about 350 kHz to about 5 MHz. Optionally, the laser source outputs one or more infrared tunable femtosecond output signals having a repetition rate from about 400 kHz to about 4 MHz.

Further, the output signal 62 may have a centroid wavelength from about 900 nm to about 2500 nm. A very popular wavelength for multi-photon microscopy, and in particular three-photon microscopy, is 1300 nm. In one embodiment, the output signal 62 has a centroid wavelength from about 1250 nm to about 1350 nm. Optionally, the output signal 62 may have a centroid wavelength from about 1650 nm to about 1750 nm, although those skilled in the art will appreciate that the laser source 10 may be configured to output an output signal having a centroid wavelength from about 900 nm to about 2500 nm.

In the illustrated embodiment, the various components forming the laser system 10, such as curved mirrors, 14, 16, 18, 20, harmonic generator 24, fold mirrors 30, 32, movable stage 34, nonlinear optical crystal 40, modulator 54, and pump source 70 may be positioned within a single housing 56. In the alternative, the various components need not be located within single housing 56. Further, in one embodiment, the output signal 62 is emitted from the housing 56. Optionally, the output signal 62 and a portion of the pump signal 60 may be emitted from the housing 56.

Figure 2:
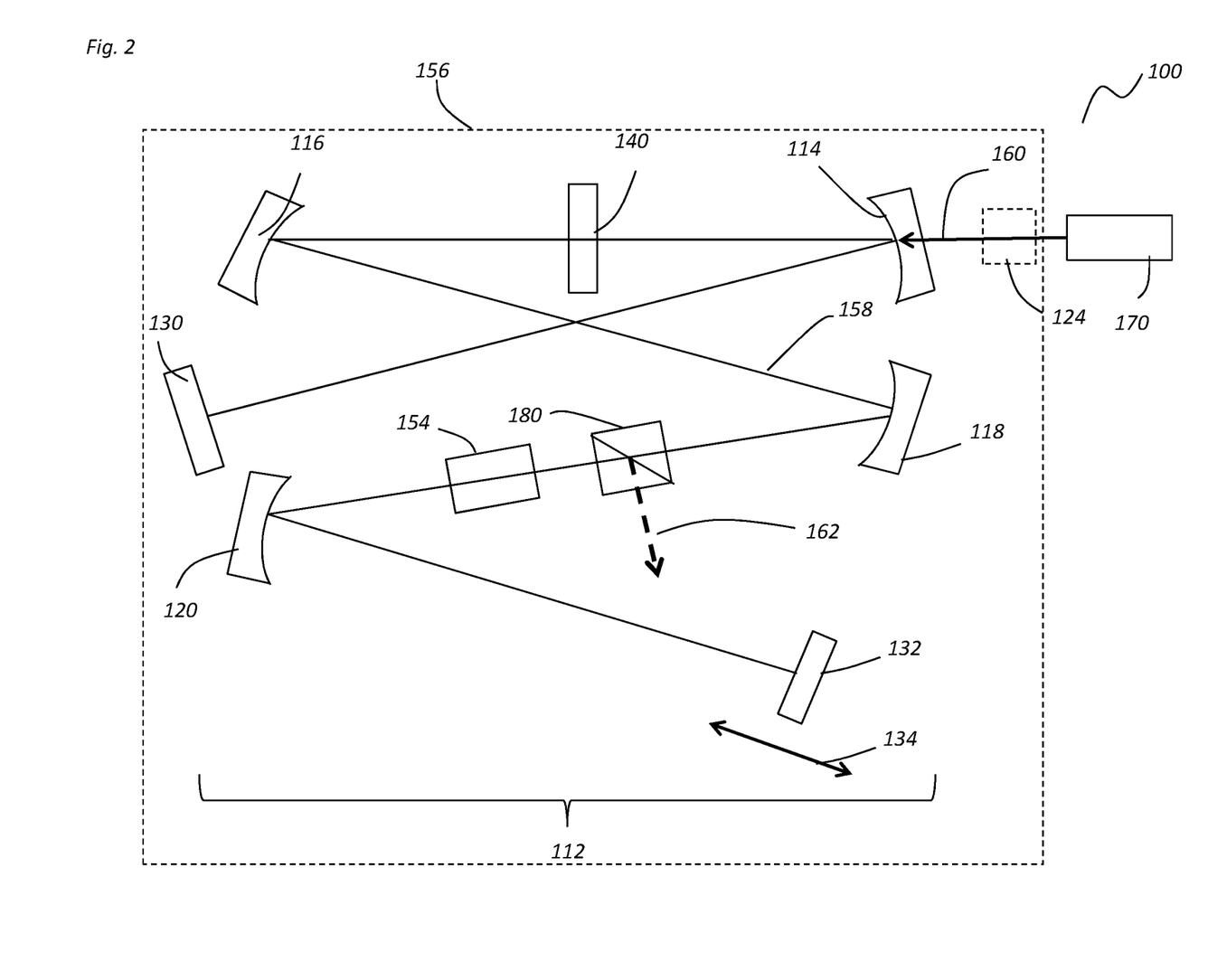
FIG. 2 shows a schematic diagram of the embodiment of a low repetition rate infrared tunable femtosecond laser source which includes polarizing beam splitter positioned within the laser cavity configured to direct at least a portion of the intracavity signal out of the cavity to form an output signal.

FIG. 2 shows another embodiment of a low repetition rate infrared tunable femtosecond laser source. As shown, the laser source 100 includes at least one cavity 112. In the illustrated embodiment, the cavity 112 may include a first curved mirror 114, a second curved mirror 116, a third curved mirror 118, and at least a fourth curved mirror 120. Optionally, any number of curved mirrors may be used in the laser source 100. Further, the laser source 100 may include one or more reflectors. The laser source 100 shown in FIG. 2 includes a first reflector 130 and at least a second reflector 132. Like the previous embodiment, in the illustrated embodiment, the first and second reflectors 130, 132 comprise planar mirrors although those skilled in the art will appreciate that at least one of the first and/or second reflectors 130, 132 may comprise curved mirrors. In one embodiment, at least one of the curved mirrors 114, 116, 118, and 120 and/or at least one of the reflectors 130, 132 may comprise a dichroic mirror configured to permit at least one pump signal to traverse there through. For example, in the illustrated embodiment, curved mirror 114 comprises a dichroic mirror configured to permit at least one pump signal 160 having at least a first wavelength to traverse there through. At least one of the curved mirrors 114, 116, 118, and 120 and/or at least one of the reflectors 130, 132 may be positioned on a movable mount 134 such that the length of the cavity 112 may be easily varied. In the illustrated embodiment, second reflector 132 is positioned on a movable mount 134 thereby permitting the cavity length to be selectively varied. For example, the position of the second reflector 132 may be varied to ensure that the length of the cavity 112 matches the repetition rate of the pump signal 160. Optionally, the movable mount 134 may be configured to permit lateral movement, longitudinal movement, and/or tip, tilt, or otherwise selectively vary the position of the second reflector 132.

Referring again to FIG. 2, in one embodiment the pump signal 160 has a wavelength from about 850 nm to about 1700 nm. In another embodiment, the pump signal 160 has a wavelength from about 950 nm to about 1250 nm. In yet another embodiment, the pump signal 160 has a wavelength from about 1000 nm to about 1100 nm. Optionally, the pump signal 160 may have a wavelength of about 1040 nm. Further, the pump signal 160 may have a pump power from about 2 W to about 70 W. In another embodiment, the pump signal 160 has a pump power from about 5 W to about 50 W. Optionally, the pump signal 160 may have a pump power from about 10 W to about 30 W, although those skilled in the art will appreciate that the laser source 100 may be configured to operate using any desired pump power. Optionally, the pump signal 160 may have a repetition rate of about 20 MHz to about 150 MHz. In another embodiment, the repetition rate is from about 40 MHz to about 80 MHz. Optionally, the repetition rate may be about 80 MHz, although those skilled in the art will appreciate that any repetition rate may be used with the laser source 100. Further, the pump signal 160 may comprise a pulsed signal, although those skilled in the art will appreciate that a continuous wave pump signal may also be used. In one embodiment, the pump signal 160 has a pulse duration from about 10 fs to about 500 fs. In another embodiment, the pulse duration of the pump signal 160 may be from about 100 fs to about 400 fs. In still another embodiment, the pump signal 160 has a pulse duration of about 150 fs to about 200 fs. In the illustrated embodiment, the pump source 170 may be configured to generate the pump signal 160. In the illustrated embodiment, the pump source 170 is located external of the housing 156, although those skilled in the art will appreciate that the pump source 170 may be located within the housing 156. Like the previous embodiment, at least one harmonic generator 124 may be used in conjunction with the pump source 170 to generate the pump signal 160 at a desired wavelength. In one exemplary embodiment, an 80 MHz pump source is used in conjunction with a tunable optical-parametric oscillator (OPO) employing cavity dumping techniques to select one or more pulses out of each pulse train within the 1 MHz output.

As shown in FIG. 2, at least one gain medium and/or nonlinear crystal 140 is positioned within the cavity 112 and pumped by the at least one pump signal 160. In one embodiment, the nonlinear crystal 140 comprises BBO. In another embodiment, the nonlinear crystal 140 comprises LBO, BiBO, BGS, BGSe, HGS, OPGaP, periodically poled PPLN, PPLT, PKTP, and other critically or non-critically phase-matched or periodically/aperiodically poled crystals and the like. In the illustrated embodiment, the nonlinear crystal 140 is positioned between the first curved mirror 114 and the second curved mirror 116 although those skilled in the art will appreciate that the nonlinear crystal may be positioned anywhere within the cavity 112.

Referring again to FIG. 2, at least one intracavity signal 158 is generated when the nonlinear crystal 140 is pumped by the pump signal 160. The intracavity signal 158 is reflected through the cavity 112 by the curved mirrors 114, 116, 118, and 120 and the reflectors 130, 132. In addition, the cavity 112 may include one or more filters, polarizers, beam splitters, modulators, lenses, dispersion compensation systems, and the like therein. For example, the laser source 100 shown in FIG. 2 includes at least one modulator 154 and at least one polarizing device or polarizing beam splitter 180 therein. In one embodiment, the modulator 154 comprises an electro-optical modulator. For example, the modulator 154 may comprise an electro-optical modulator manufactured from BBO, Rubidium titanyl phosphate (RTP), Potassium-rubidium titanyl phosphate (KRTP), Potassium titanyl phosphate (KTP), Lithium Niobate and the like, which, under high voltage, may be configured to vary the polarization of the intracavity signal 158. Those skilled in the art will appreciate that any variety of modulators may be used with the laser source 100. During operation, the modulator 154, in conjunction with the polarizing beam splitter 180, may be configured to direct at least a portion of the intracavity signal 158 out of the cavity 112 to form at least one output signal 162.

In one embodiment, the output signal 162 has centroid wavelength from about 800 nm to about 2500 nm. In another embodiment, the output signal 162 has centroid wavelength from about 1100 nm to about 1400 nm. Optionally, the output signal 162 has centroid wavelength from about 1250 nm to about 1350 nm. In one specific embodiment, the output signal 162 has a centroid wavelength of about 1300 nm. In another embodiment, the output signal 162 has centroid wavelength from about 1500 nm to about 1850 nm. Optionally, the output signal 162 has centroid wavelength from about 1650 nm to about 1750 nm. Optionally, the output signal 162 may have a centroid wavelength of about 1700 nm. In another embodiment, the output signal 162 has a centroid wavelength from about 900 nm to about 950 nm. The output signal 162 may have a pulse energy from about 250 nJ to about 2500 nJ. Optionally, the output signal 162 may have a pulse energy from about 500 nJ to about 1500 nJ. Further, the output signal 162 may have a pulse duration from about 20 fs to about 500 fs. In another embodiment, the output signal 162 may have a pulse duration from about 50 fs to about 150 fs. The output signal 162 may have a repetition rate from about 100 kHz to about 12 MHz. In another embodiment, the output signal 162 may have a repetition rate from about 400 kHz to about 4 MHz. Further, unlike prior art optical parametric amplifier and optical parametric oscillator systems, various characteristics of the laser source 100 described above may be easily and quickly adjusted or varied. For example, the user may easily adjust the repetition rate for the laser source 100 from about 100 kHz to about 12 MHz. In another embodiment, the wavelength of the output signal 162 may be selectively varied. For example, in one specific embodiment, the wavelength of the output signal 162 may be varied from about 1300 nm to about 1700 nm. Those skilled in the art will appreciate that any variety of characteristics may be varied, including, without limitations, repetition rate, pulse duration, pulse energy, wavelength, and the like. Further, unlike prior art systems the laser source 100 shown in FIG. 2 may be contained within a single housing 156 thereby reducing system cost, complexity, and footprint. Further, in one embodiment, the output signal 162 is emitted from the housing 156. Optionally, the output signal 162 and a portion of the pump signal 160 may be emitted from the housing 156.

Figure 3:
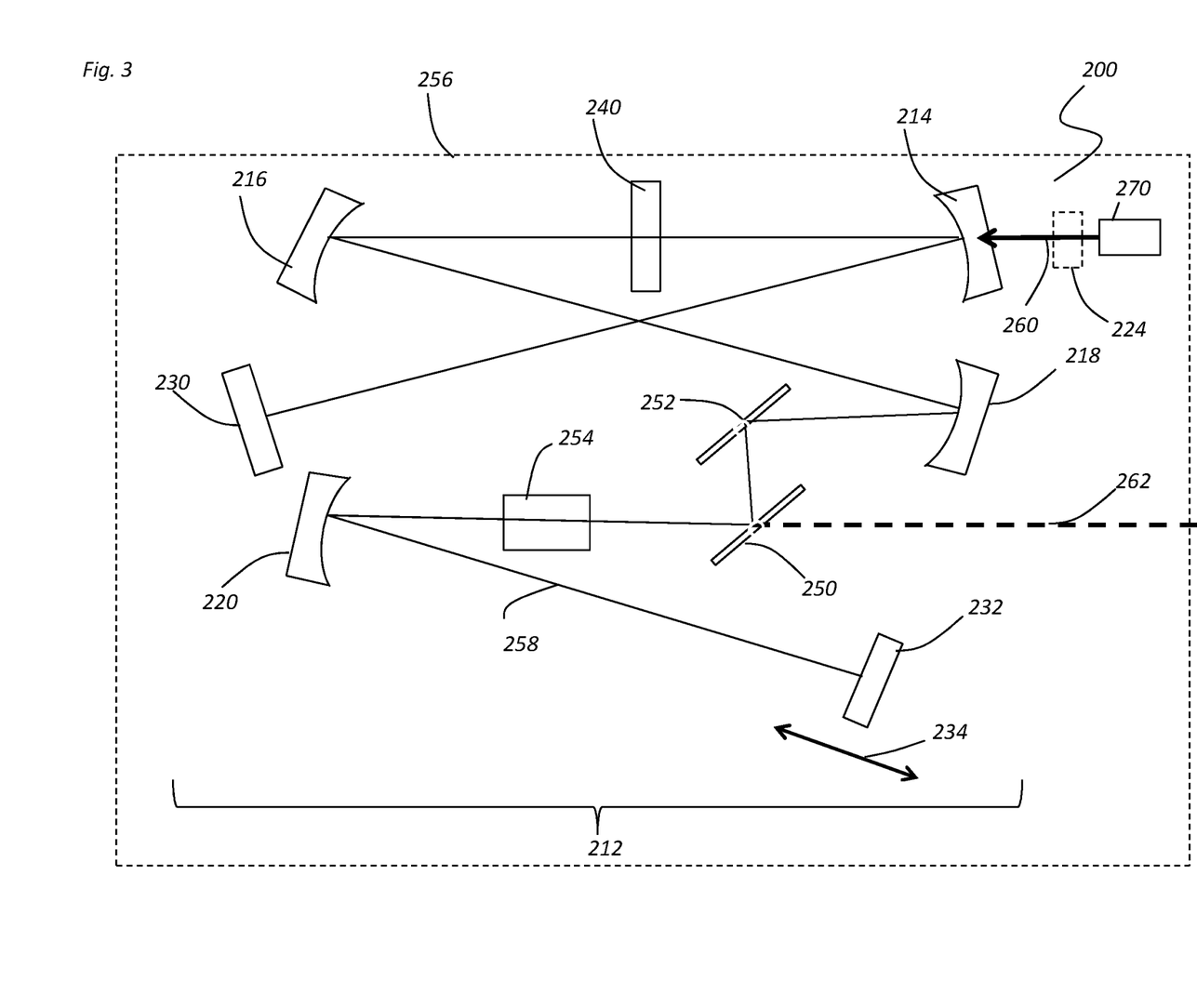
FIG. 3 shows a schematic diagram of the embodiment of a low repetition rate infrared tunable femtosecond laser source which includes at least one thin film polarizer positioned within the laser cavity and configured to direct at least a portion of the intracavity signal out of the cavity to form an output signal.

FIG. 3 shows an embodiment of a low repetition rate infrared tunable femtosecond laser source. As shown, the laser source 200 includes at least one cavity 212 formed by at least one highly reflective mirror. In the illustrated embodiment, the cavity 212 may include a first curved mirror 214, a second curved mirror 216, a third curved mirror 218, and at least a fourth curved mirror 220. Optionally, any number of curved mirrors may be used in the laser source 200. Further, the laser source 200 may include one or more reflectors. The laser source 200 shown in FIG. 3 may include a first reflector 230 and at least a second reflector 232. In the illustrated embodiment, the first and second reflectors 230, 232 comprises a planar mirror, although those skilled in the art will appreciate that the first and/or second reflectors 230, 232 may comprise curved mirrors. In one embodiment, at least one of the curved mirrors 214, 216, 218, and 220 and/or at least one of the reflectors 230, 232 may comprise a dichroic mirror configured to permit at least one pump signal to traverse there through. For example, in the illustrated embodiment, the curved mirror 214 comprises a dichroic mirror configured to permit at least one pump signal 260 having at least a first wavelength to traverse there through. At least one of the curved mirrors 214, 216, 218, and 220 and/or at least one of the reflectors 230, 232 may be positioned on a movable mount 234 such that the length of the cavity 212 may be easily varied. In the illustrated embodiment, the second reflector 232 is positioned on a movable mount 234 thereby permitting the cavity length to be selectively varied. For example, the position of mirror 232 may be varied to ensure that the length of the cavity 212 matches the repetition rate of the pump signal 260. Optionally, the movable mount 234 may be configured to permit lateral movement, longitudinal movement, and/or tip, tilt, or otherwise selectively vary the position of the second reflector 232.

Referring again to FIG. 3, in one embodiment the pump signal 260 has a wavelength from about 850 nm to about 1700 nm. In another embodiment, the pump signal 260 has a wavelength from about 950 m to about 1250 nm. In yet another embodiment, the pump signal 260 has a wavelength from about 1000 nm to about 1100 nm. Optionally, the pump signal 260 may have a wavelength of about 1040 nm. Like the previous embodiments, at least one harmonic generator 224 may be used in conjunction with the pump source 270 to generate the pump signal 260 at a desired wavelength. Further, the pump signal 260 may have a pump power from about 2 W to about 70 W. In another embodiment, the pump signal 260 has a pump power from about 5 W to about 50 W. Optionally, the pump signal 260 may have a pump power from about 10 W to about 30 W, although those skilled in the art will appreciate that the laser source 200 may be configured to operate using any desired pump power. Optionally, the pump signal 260 may have a repetition rate of about 20 MHz to about 150 MHz. In another embodiment, the repetition rate is from about 40 MHz to about 80 MHz. Optionally, the repetition rate may be about 80 MHz, although those skilled in the art will appreciate that any repetition rate may be used with the laser source 200. Further, the pump signal 260 may comprise a pulsed signal, although those skilled in the art will appreciate that a continuous wave pump signal may also be used. In one embodiment, the pump signal 260 has a pulse duration from about 10 fs to about 500 fs. In another embodiment, the pulse duration of the pump signal 260 may be from about 100 fs to about 400 fs. In still another embodiment, the pump signal 260 has a pulse duration of about 150 fs to about 200 fs.

As shown in FIG. 3, at least one gain medium and/or nonlinear crystal 240 may be positioned within the cavity 212 and pumped by the at least one pump signal 260. In one embodiment, the nonlinear crystal 240 comprises BBO. In another embodiment, the nonlinear crystal 240 comprises LBO, BiBO, BGS, BGSe, HGS, OPGaP, periodically poled PPLN, PPLT, PKTP, and other critically or non-critically phase-matched or periodically/aperiodically poled crystals and the like. In the illustrated embodiment, the nonlinear crystal 240 is positioned between the first curved mirror 214 and the second curved mirror 216 although those skilled in the art will appreciate that the nonlinear crystal may be positioned anywhere within the cavity 212.

Referring again to FIG. 3, at least one intracavity signal 258 is generated when the nonlinear crystal 240 is pumped by the pump signal 260. The intracavity signal 258 is reflected through the cavity 212 by the curved mirrors 214, 216, 218, and 220 and the reflectors 230, 232. In addition, the cavity 212 may include one or more filters, polarizers, beam splitters, modulators, lenses, dispersion compensation systems, and the like therein. For example, the laser source 210 shown in FIG. 3 includes a first thin film polarizer 250 and a second thin film polarizer 252 therein. Those skilled in the art will appreciate that any number and/or variety of polarizers may be used in the laser source 210. In addition, the laser source 200 includes at least one modulator 254 therein. In one embodiment, the modulator 254 comprises an electro-optical modulator. For example, the modulator 254 may comprise an electro-optical modulator manufactured from BBO, RTP, KRTP, KTP, and the like, which, under high voltage, may be configured to vary the polarization of the intracavity signal 258. Those skilled in the art will appreciate that any variety of modulators may be used with the laser source 200. During operation, the first thin film polarizer 250, and second thin film polarizer 252, in conjunction with the modulator 254, may be configured to direct at least a portion of the intracavity signal 258 out of the cavity 212 to form at least one output signal 262.

In one embodiment, the output signal 262 has centroid wavelength from about 800 nm to about 2000 nm. In another embodiment, the output signal 262 has centroid wavelength from about 1100 nm to about 1400 nm. Optionally, the output signal 262 has centroid wavelength from about 1250 nm to about 1350 nm. In a specific embodiment, the output signal 262 has a centroid wavelength of about 1300 nm. I another embodiment the output signal 262 has a centroid wavelength of about 1700 nm. In another embodiment, the output signal 262 has centroid wavelength from about 1500 nm to about 1850 nm. Optionally, the output signal 262 has centroid wavelength from about 1650 nm to about 1750 nm. In another embodiment, the output signal 262 has a wavelength from about 900 nm to about 950 nm. Those skilled in the art will appreciate that the wavelength may be easily tuned within the ranges described above in any variety of ways. For example, computer-controlled stages supporting the mirrors 214, 216, 218, 220, and reflectors 230, and 232 may be used to selectively vary the wavelength. The output signal 262 may have a pulse energy from about 250 nJ to about 2500 nJ. Optionally, the output signal 262 may have a pulse energy from about 500 nJ to about 1500 nJ. Further, the output signal 262 may have a pulse duration from about 20 fs to about 500 fs. In another embodiment, the output signal 262 may have a pulse duration from about 50 fs to about 150 fs. The output signal 262 may have a repetition rate from about 100 kHz to about 12 MHz. In another embodiment, the output signal 262 may have a repetition rate from about 4 kHz to about 4 MHz. Further, unlike prior art systems, various characteristics of the laser source 200 described above may be easily and quickly adjusted or varied. For example, the user may easily adjust the repetition rate for the laser source from about 500 kHz to about 12 MHz. Those skilled in the art will appreciate that any variety of characteristics may be varied, including, without limitations, repetition rate, pulse duration, pulse energy, wavelength, and the like. Further, unlike prior art systems the laser source 200 shown in FIG. 3 may be contained within a single housing 256 thereby reducing system cost, complexity, and footprint. Further, in one embodiment, the output signal 262 is emitted from the housing 256. Optionally, the output signal 262 and a portion of the pump signal 260 may be emitted from the housing 256.

Figure 4:
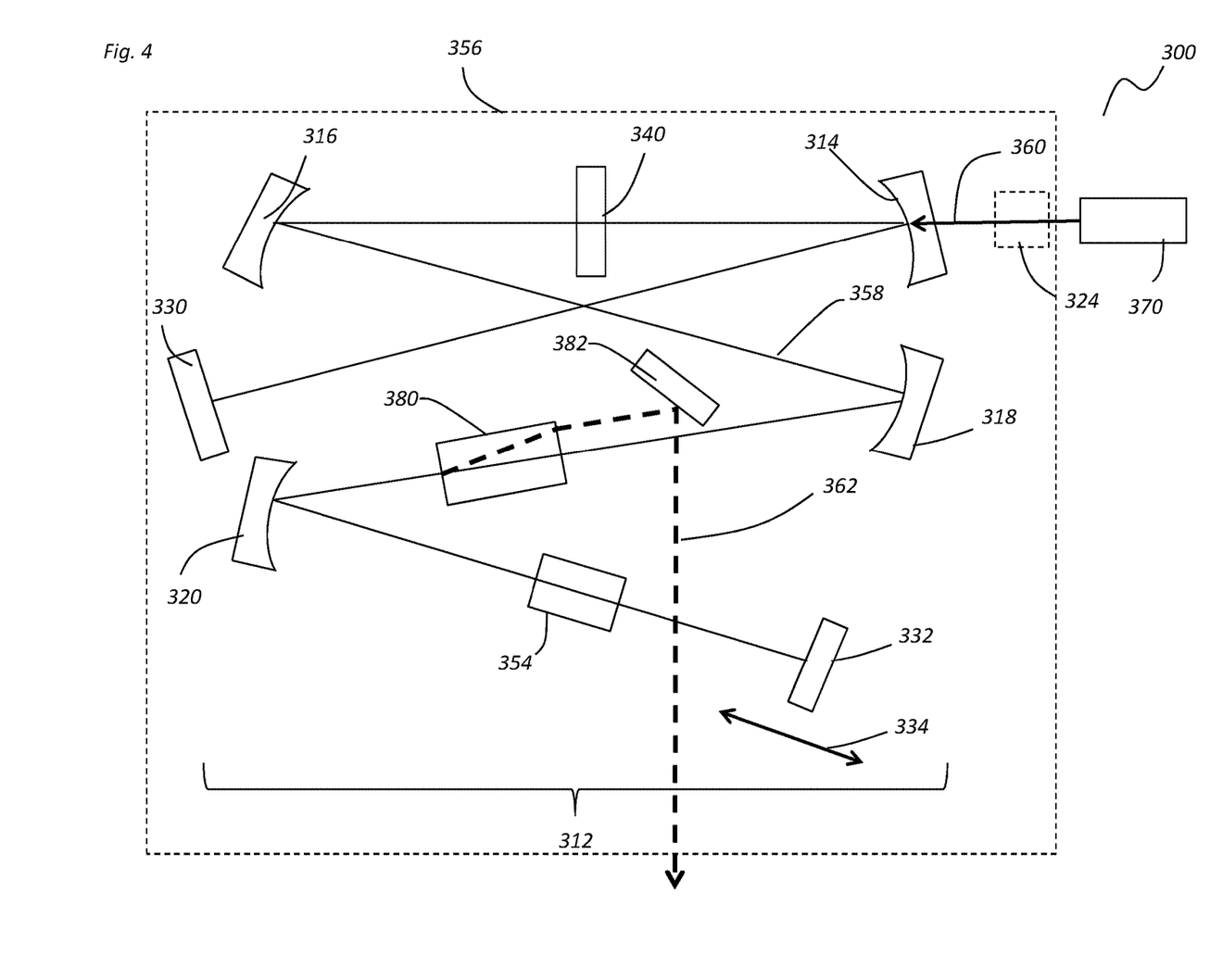
FIG. 4 shows a schematic diagram of the embodiment of a low repetition rate infrared tunable femtosecond laser source which includes at least one birefringent crystal beam splitter positioned within the laser cavity configured to direct at least a portion of the intracavity signal out of the cavity to form an output signal.

FIG. 4 shows another embodiment of a low repetition rate infrared tunable femtosecond laser source. As shown, the laser source 300 includes at least one cavity 312. In the illustrated embodiment, the cavity 312 may include a first curved mirror 314, a second curved mirror 316, a third curved mirror 318, and at least a fourth curved mirror 320. Optionally, any number of curved mirrors may be used in the laser source 300. Further, the laser source 300 may include one or more reflectors. In the illustrated embodiment, the laser source 300 shown in FIG. 4 includes a first reflector 330 and at least a second reflector 332. Like the previous embodiment, in the illustrated embodiment, the first and second reflectors 330, 332 comprise planar mirrors although those skilled in the art will appreciate that at least one of the first and/or second reflectors 330, 332 may comprise curved mirrors. In one embodiment, at least one of the curved mirrors 314, 316, 318, and 320 and/or at least one of the reflectors 330, 332 may comprise a dichroic mirror configured to permit at least one pump signal to traverse there through. For example, in the illustrated embodiment, curved mirror 314 comprises a dichroic mirror configured to permit at least one pump signal 360 having at least a first wavelength to traverse there through. At least one of the curved mirrors 314, 316, 318, and 320 and/or at least one of the reflectors 330, 332 may be positioned on a movable mount 334 such that the length of the cavity 312 may be easily varied. In the illustrated embodiment, second reflector 332 is positioned on a movable mount 334 thereby permitting the cavity length to be selectively varied. For example, the position of the second reflector 332 may be varied to ensure that the length of the cavity 312 matches the repetition rate of the pump signal 360. Optionally, the movable mount 334 may be configured to permit lateral movement, longitudinal movement, and/or tip, tilt, or otherwise selectively vary the position of the second reflector 332.

FIG. 4, in one embodiment the pump signal 360 has a wavelength from about 850 nm to about 1700 nm. In another embodiment, the pump signal 360 has a wavelength from about 950 nm to about 1250 nm. In yet another embodiment, the pump signal 360 has a wavelength from about 1000 nm to about 1100 nm. Optionally, the pump signal 360 may have a wavelength of about 1040 nm. Further, the pump signal 360 may have a pump power from about 2 W to about 70 W. In another embodiment, the pump signal 360 has a pump power from about 5 W to about 50 W. Optionally, the pump signal 360 may have a pump power from about 10 W to about 30 W, although those skilled in the art will appreciate that the laser source 300 may be configured to operate using any desired pump power. Optionally, the pump signal 360 may have a repetition rate of about 20 MHz to about 150 MHz. In another embodiment, the repetition rate is from about 40 MHz to about 80 MHz. Optionally, the repetition rate may be about 80 MHz, although those skilled in the art will appreciate that any repetition rate may be used with the laser source 300. Further, the pump signal 360 may comprise a pulsed signal, although those skilled in the art will appreciate that a continuous wave pump signal may also be used. In one embodiment, the pump signal 360 has a pulse duration from about 10 fs to about 500 fs. In another embodiment, the pulse duration of the pump signal 360 may be from about 100 fs to about 400 fs. In still another embodiment, the pump signal 360 has a pulse duration of about 150 fs to about 200 fs. In the illustrated embodiment, the pump source 370 may be configured to generate the pump signal 360. Optionally, the pump source 370 may be located within the housing 356 or external of the housing 356. Like the previous embodiment, at least one harmonic generator 324 may be used in conjunction with the pump source 370 to generate the pump signal 360 at a desired wavelength.

As shown in FIG. 4, at least one gain medium and/or nonlinear crystal 340 is positioned within the cavity 312 and pumped by the at least one pump signal 360. In one embodiment, the nonlinear crystal 340 comprises BBO. In another embodiment, the nonlinear crystal 340 comprises LBO, BiBO, BGS, BGSe, HGS, OPGaP, periodically poled PPLN, PPLT, PKTP, and other critically or non-critically phase-matched or periodically/aperiodically poled crystals and the like. In the illustrated embodiment, the nonlinear crystal 340 is positioned between the first curved mirror 314 and the second curved mirror 316 although those skilled in the art will appreciate that the nonlinear crystal may be positioned anywhere within the cavity 312.

Referring again to FIG. 4, at least one intracavity signal 358 is generated when the nonlinear crystal 340 is pumped by the pump signal 360. The intracavity signal 358 is reflected through the cavity 312 by the curved mirrors 314, 316, 318, and 320 and the reflectors 330, 332. In addition, the cavity 312 may include one or more filters, polarizers, beam splitters, modulators, lenses, dispersion compensation systems, and the like therein. For example, the laser source 300 shown in FIG. 4 includes at least one modulator 354 and at least one birefringent crystal beam splitter 380 therein. Those skilled in the art will appreciate that a variety of crystal materials can be used for the birefringent crystal beam splitter 380 including Yttrium Vanadate, Quartz, Alpha Barium Borate, Calcite, Rutile, or Magnesium Fluoride. Additionally, those skilled in the art will appreciate that birefringent crystal beam splitters can be used in a variety of orientations, including but not limited to, Rochon prisms, beam displacers, Wollaston prisms, or Glan-Taylor polarizers. In one embodiment, the modulator 354 comprises an electro-optical modulator. For example, the modulator 354 may comprise an electro-optical modulator manufactured from BBO, RTP, KRTP, KTP, Lithium Niobate and the like, which, under high voltage, may be configured to vary the polarization of the intracavity signal 358. Those skilled in the art will appreciate that any variety of modulators may be used with the laser source 300. During operation, the modulator 354, in conjunction with the birefringent beam displacer 380, and pickoff mirror 382, may be configured to direct at least a portion of the intracavity signal 358 out of the cavity 312 to form at least one output signal 362. In one embodiment, the output signal 362 has centroid wavelength from about 800 nm to about 2000 nm. In another embodiment, the output signal 362 has centroid wavelength from about 1100 nm to about 1400 nm. Optionally, the output signal 362 has centroid wavelength from about 1250 nm to about 1350 nm. In another embodiment, the output signal 362 has centroid wavelength from about 1500 nm to about 1850 nm. Optionally, the output signal 362 has centroid wavelength from about 1650 nm to about 1750 nm. In another embodiment, the output signal 362 has a centroid wavelength from about 900 nm to about 950 nm. The output signal 362 may have a pulse energy from about 250 nJ to about 2500 nJ. Optionally, the output signal 362 may have a pulse energy from about 500 nJ to about 1500 nJ. Further, the output signal 362 may have a pulse duration from about 20 fs to about 500 fs. In another embodiment, the output signal 362 may have a pulse duration from about 50 fs to about 150 fs. The output signal 362 may have a repetition rate from about 500 kHz to about 12 MHz. In another embodiment, the output signal 362 may have a repetition rate from about 1 MHz to about 4 MHz. Further, unlike prior art systems, various characteristics of the laser source 300 described above may be easily and quickly adjusted or varied. For example, the user may easily adjust the repetition rate for the laser source 300 from about 500 kHz to about 12 MHz. Those skilled in the art will appreciate that any variety of characteristics may be varied, including, without limitations, repetition rate, pulse duration, pulse energy, wavelength, and the like. Further, unlike prior art systems the laser source 300 shown in FIG. 4 may be contained within a single housing 356 thereby reducing system cost, complexity, and footprint. Further, in one embodiment, the output signal 362 is emitted from the housing 356. Optionally, the output signal 362 and a portion of the pump signal 360 may be emitted from the housing 356.

While particular forms of embodiments have been illustrated and described, it will be apparent that various modifications can be made without departing from the spirit and scope of the embodiments of the invention. Accordingly, it is not intended that the invention be limited by the forgoing detailed description

What is claimed is:

1. A low repetition rate infrared tunable femtosecond laser source, comprising:
   a laser cavity having at least one curved mirror and at least one reflector positioned therein;
   at least one pulsed pump source in communication with the laser cavity, the pump source configured to emit at least one pump signal;
   at least one nonlinear optical crystal positioned within the laser cavity, the at least one nonlinear optical crystal configured to generate at least one intracavity signal when the at least one nonlinear optical crystal is pumped by the at least one pump signal;
   at least one modulator positioned within the laser cavity and configured to selectively modulate the at least one intracavity signal;
   at least one movable stage supporting at least one of the at least one curved mirror and at least one reflector, the at least one movable stage configured to selectively position at least one of the at least one curved mirror and the at least one reflector; and
   at least one output signal generated within and emitted from the laser cavity, the at least one output signal comprising at least a portion of the at least one intracavity signal, the at least one output signal selectable between a first wavelength range of 1200 nm and 1400 nm and at least a second wavelength range of 1600 nm and 1800 nm.

2. The low repetition rate infrared tunable femtosecond laser source of claim 1 wherein the at least one pump source comprises at least one mode-locked laser.

3. The low repetition rate infrared tunable femtosecond laser source of claim 1 wherein the at least one mode-locked laser has at least one gain medium selected from the group Yb:YAG, Yb:KGW, Yb:CaF$_2$, Yb:CALGO, Yb:KYW, and a fiber laser.

4. The low repetition rate infrared tunable femtosecond laser source of claim 1 further comprising at least one harmonic generator in optical communication with the at least one pump source wherein the at least one pump signal is a harmonic of the output of the at least one pump source.

5. The low repetition rate infrared tunable femtosecond laser source of claim 1 wherein the at least one nonlinear optical crystal is selected from the group consisting of LBO, BiBO, BBO, PPLN, PPLT, PKTP, critically phase matched crystals, non-critically phased-matched crystals, periodically poled crystals, and aperiodically poled crystals.

6. The low repetition rate infrared tunable femtosecond laser source of claim 1 wherein the at least one modulator comprises an acousto-optical modulator.

7. The low repetition rate infrared tunable femtosecond laser source of claim 6 wherein the at least one modulator is selected from the group consisting of fused silica, crystalline quartz, flint glass, chalcogenide glass, Germanium, GaP, Lithium Niobate, and TeO$_2$.

8. The low repetition rate infrared tunable femtosecond laser source of claim 1 wherein the at least one modulator comprises an electro-optical modulator.

9. The low repetition rate infrared tunable femtosecond laser source of claim 8 wherein the at least one electro-optical modulator is selected from the group consisting of BBO, RTP, KRTP, KTP, and Lithium Niobate.

10. The low repetition rate infrared tunable femtosecond laser source of claim 1 wherein the at least one modulator is configured to operate as a cavity dumper.

11. The low repetition rate infrared tunable femtosecond laser source of claim 1 further comprising at least one polarizing beam splitter positioned within the laser cavity, the at least one polarizing beam splitter configured to output the at least one output signal from the laser cavity.

12. The low repetition rate infrared tunable femtosecond laser source of claim 1 further comprising at least one thin film polarizer positioned within the laser cavity, the at least one thin film polarizer configured to output the at least one output signal from the laser cavity.

13. The low repetition rate infrared tunable femtosecond laser source of claim 1 further comprising at least one birefringent crystal beam splitter within the laser cavity, the at least one birefringent crystal beam splitter configured to output the at least one output signal from the laser cavity.

14. The low repetition rate infrared tunable femtosecond laser source of claim 1 wherein the at least one output signal has a pulse energy from about 250 nJ to about 2500 nJ.

15. The low repetition rate infrared tunable femtosecond laser source of claim 1 wherein the at least one output signal has a pulse energy from about 500 nJ to about 1500 nJ.

16. The low repetition rate infrared tunable femtosecond laser source of claim 1 wherein the at least one output signal has a pulse duration less than 200 fs.

17. The low repetition rate infrared tunable femtosecond laser source of claim 1 wherein the at least one output signal has a repetition rate from about 200 kHz to about 12 MHz.

18. The low repetition rate infrared tunable femtosecond laser source of claim 1 wherein the at least one output signal has a repetition rate from about 400 kHz to about 4 MHz.

19. The low repetition rate infrared tunable femtosecond laser source of claim 1 wherein the at least one output signal has a peak power of 4 MW.

20. A low repetition rate infrared tunable femtosecond laser source, comprising:
   a laser cavity having at least one curved mirror and at least one reflector positioned therein;
   at least one pulsed pump source in communication with the laser cavity, the pump source configured to emit at least one pump signal;
   at least one nonlinear optical crystal positioned within the laser cavity, the at least one nonlinear optical crystal configured to generate at least one intracavity signal when the at least one nonlinear optical crystal is pumped by the at least one pump signal;
   at least one electro-optical modulator positioned within the laser cavity and configured to selectively modulate the at least one intracavity signal; and at least one output signal generated within and emitted from the laser cavity via the electro-optical modulator and at least one additional optical element positioned within the laser cavity, the at least one output signal comprising at least a portion of the at least one intracavity signal.

21. The low repetition rate infrared tunable femtosecond laser source of claim 20 wherein at least one of the at least one curved mirror and at least one reflector comprises a dichroic mirror.

22. The low repetition rate infrared tunable femtosecond laser source of claim 20 wherein the at least one pump source comprises at least one mode-locked laser.

23. The low repetition rate infrared tunable femtosecond laser source of claim 20 further comprising at least one harmonic generator in optical communication with the at least one pump source wherein the at least one pump signal is a harmonic of the output of the at least one pump source.

24. The low repetition rate infrared tunable femtosecond laser source of claim 20 wherein the at least one nonlinear optical crystal comprises BBO.

25. The low repetition rate infrared tunable femtosecond laser source of claim 20 wherein the at least one nonlinear optical crystal is selected from the group consisting of LBO, BiBO, BBO, PPLN, PPLT, PKTP, critically phase matched crystals, non-critically phased-matched crystals, periodically poled crystal, and aperiodically poled crystals.

26. The low repetition rate infrared tunable femtosecond laser source of claim 20 wherein the at least one electro-optical modulator is configured to operate as a cavity dumper.

27. The low repetition rate infrared tunable femtosecond laser source of claim 20 wherein the at least one additional optical element comprises at least one polarizing beam splitter, the at least one polarizing beam splitter configured to output the at least one output signal from the laser cavity.

28. The low repetition rate infrared tunable femtosecond laser source of claim 20 wherein the at least one additional optical element comprises at least one thin film polarizer positioned within the laser cavity, the at least one thin film polarizer configured to output the at least one output signal from the laser cavity.

29. The low repetition rate infrared tunable femtosecond laser source of claim 20 wherein the at least one additional optical element comprises at least one birefringent crystal beam splitter within the laser cavity, the at least one birefringent crystal beam splitter configured to output the at least one output signal from the laser cavity.

30. The low repetition rate infrared tunable femtosecond laser source of claim 20 further comprising at least one movable stage positioned within the laser cavity and configured to move at least one of the at least one curved mirror and the at least reflector mirror to vary a cavity length of the laser cavity.

31. The low repetition rate infrared tunable femtosecond laser source of claim 20 wherein the at least one output signal has a pulse energy from about 250 nJ to about 2500 nJ.

32. The low repetition rate infrared tunable femtosecond laser source of claim 20 wherein the at least one output signal has a pulse energy from about 500 nJ to about 1500 nJ.

33. The low repetition rate infrared tunable femtosecond laser source of claim 20 wherein the at least one output signal has a pulse duration less than 200 fs.

34. The low repetition rate infrared tunable femtosecond laser source of claim 20 wherein the at least one output signal has a repetition rate from about 200 kHz to about 12 MHz.

35. The low repetition rate infrared tunable femtosecond laser source of claim 20 wherein the at least one output signal has a repetition rate from about 400 kHz to about 4 MHz.

36. The low repetition rate infrared tunable femtosecond laser source of claim 20 wherein the at least one output signal has a peak power of 4 MW.

37. The low repetition rate infrared tunable femtosecond laser source of claim 20 wherein the at least one output signal is selectable between a first wavelength range of 1200 nm and 1400 nm and at least a second wavelength range of 1600 nm and 1800 nm.

* * * * *